(12) United States Patent
Wang et al.

(10) Patent No.: US 10,664,623 B2
(45) Date of Patent: May 26, 2020

(54) METHOD FOR CHIP ENCRYPTION

(71) Applicant: Guangzhou ZHONO Electronic Technology Co., Ltd., Guangzhou, Guangdong (CN)

(72) Inventors: Bo Wang, Guangdong (CN); Hongcheng Mao, Guangdong (CN); Weihu Duan, Guangdong (CN)

(73) Assignee: Guangzhou ZHONO Electronic Technology Co., Ltd., Guangzhou (CN)

( * ) Notice: Subject to any disclaimer, the term of this patent is extended or adjusted under 35 U.S.C. 154(b) by 68 days.

(21) Appl. No.: 15/764,323

(22) PCT Filed: Apr. 11, 2017

(86) PCT No.: PCT/CN2017/080020
§ 371 (c)(1),
(2) Date: Mar. 29, 2018

(87) PCT Pub. No.: WO2018/166020
PCT Pub. Date: Sep. 20, 2018

(65) Prior Publication Data
US 2019/0156068 A1    May 23, 2019

(30) Foreign Application Priority Data

Mar. 17, 2017    (CN) .......................... 2017 1 0160228

(51) Int. Cl.
*G06F 21/72*    (2013.01)
*G06F 21/76*    (2013.01)
*G06F 21/60*    (2013.01)

(52) U.S. Cl.
CPC ............ *G06F 21/76* (2013.01); *G06F 21/602* (2013.01); *G06F 21/72* (2013.01)

(58) Field of Classification Search
CPC ...................................................... G06F 21/72
See application file for complete search history.

(56) References Cited

U.S. PATENT DOCUMENTS

| | | | | |
|---|---|---|---|---|
| 6,635,048 B1* | 10/2003 | Ullestad | ............ | A61M 5/14276 604/890.1 |
| 2006/0150079 A1* | 7/2006 | Albornoz | ................ | G06F 16/93 715/230 |
| 2006/0259258 A1* | 11/2006 | Shipton | ................ | B41J 2/04505 702/81 |
| 2010/0217796 A1* | 8/2010 | Palthepu | ............... | G06F 16/182 709/203 |

(Continued)

*Primary Examiner* — Thaddeus J Plecha

(57) ABSTRACT

A method for chip encryption includes obtaining a fuse value and a trim value of a chip and setting an encryption algorithm, setting the fuse value and the trim value as parameters of the encryption algorithm and obtaining a secret key which is unique for the chip accordingly to the encryption algorithm, and storing the fuse value, the trim value and the secret key in the chip. Since the fuse value and trim value of the chip are unique naturally, the secret key obtained from the same matrix chip for different applications or different matrix chips for the same application are different from each other, thereby increasing expenses and difficulty for crackers to crack the chip and protecting user's intellectual property perfectly.

17 Claims, 1 Drawing Sheet

(56) References Cited

U.S. PATENT DOCUMENTS

| | | | | |
|---|---|---|---|---|
| 2012/0148047 A1* | 6/2012 | Trimmer | ............... | G06F 21/64 380/277 |
| 2013/0315397 A1* | 11/2013 | Tuers | ............... | G06F 11/1012 380/287 |
| 2014/0063962 A1* | 3/2014 | Sakurai | ............ | G11C 16/3427 365/185.17 |
| 2014/0189365 A1* | 7/2014 | Cox | ............ | G06F 21/72 713/189 |
| 2014/0193154 A1* | 7/2014 | Graham | ............... | H04L 67/28 398/79 |
| 2014/0259024 A1* | 9/2014 | Sridharan | ............ | G06F 9/485 718/106 |
| 2014/0285322 A1* | 9/2014 | Cox | ............ | B63C 9/0005 340/7.58 |
| 2015/0130506 A1* | 5/2015 | Bhunia | ............... | G11C 17/16 326/8 |
| 2015/0302033 A1* | 10/2015 | Jarnikov | ............ | H04L 65/4084 707/695 |
| 2017/0176524 A1* | 6/2017 | Dewan | ............ | G01R 31/3177 |
| 2018/0091096 A1* | 3/2018 | Wu | ............ | H03B 5/24 |

* cited by examiner

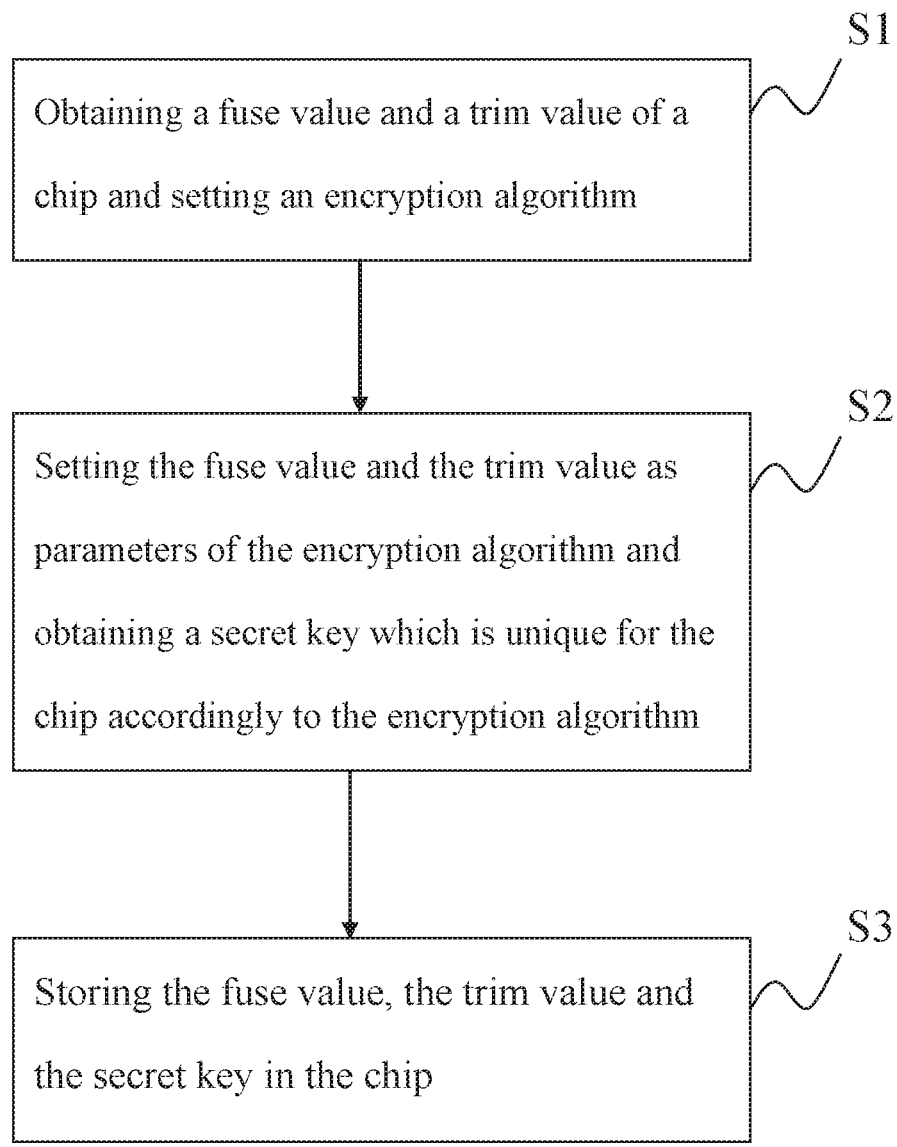

METHOD FOR CHIP ENCRYPTION

FIELD OF THE INVENTION

The present invention relates to a field of security chips, and more particularly, to a method for chip encryption.

BACKGROUND OF THE INVENTION

Cryptographic security chips have been developed as embedded systems with complicated software and hardware, with an improvement of SOC design and technology. However, security problems are occurred since the cryptographic security chips are involved with encryption algorithms and secret keys which may be attacked by a cracker by means of reading, analyzing and dissecting, including ultrahigh or ultralow clock frequency attacks, physical detection attacks, energy attacks, side channel attacks or DPA attacks, etc.

Nowadays, a chip is usually encrypted by means of a fixed encryption algorithm, a fixed secret key or an ID number of the chip. Thus crackers only need to crack a matrix chip or delete the binding of the ID number of the chip under a help of software to obtain the encryption algorithm and the secret key of the matrix chip, thereby obtaining all secret keys of the batch chips corresponding with the matrix chip.

Most of the cryptographic security chips have a built-in encryption algorithm by designing an AES module or a 3DES encryption module, etc. The same secret key is utilized and solidified into the chip when the chip is designed. For the same matrix chip, the same encryption algorithm and the same secret key are applied.

More importantly, the matrix chip may be utilized in different applications. That is to say, crackers can obtain all applications of the matrix chip once the matrix chip is cracked successfully. By this token, cracking the cryptographic security chips nowadays is easy and low-cost for crackers.

SUMMARY OF THE INVENTION

In order to solve the above technical problems, the present invention provides a method for chip encryption with high security and high cost for cracking, and the method for encryption has an unique secret key.

The method for chip encryption provided by the present invention includes obtaining a fuse value and a trim value of a chip and setting an encryption algorithm, setting the fuse value and the trim value as parameters of the encryption algorithm and obtaining a secret key which is unique for the chip accordingly to the encryption algorithm, and storing the fuse value, the trim value and the secret key in the chip.

Preferably, the trim value is a value for trimming an electric current, a voltage or a resistance of an analog circuit in the chip during a test.

Preferably, the analog circuit includes at least one selected from a group consisting of a LDO circuit, a BGR circuit and an OSC circuit.

Preferably, the fuse value is a value for fusing a fuse wire in the chip, which is obtained during a test.

Preferably, the method for chip encryption further includes fusing the fuse wire of the chip after the test is finished.

Preferably, the fuse value of the chip is unique.

Preferably, the trim value of the chip is unique.

Preferably, the chip includes an external storage and an internal storage, and the fuse value, the trim value and the secret key are stored in the internal storage.

Preferably, the internal storage includes a chip memory and a last cache of a processor, the external storage includes a volatile memory and a nonvolatile memory.

Preferably, the encryption algorithm is at least one selected from a group consisting of a symmetry algorithm, an asymmetric algorithm, a hash algorithm and a custom algorithm.

As compared with prior arts, in the method for chip encryption provided by the present invention, parameters of the encryption algorithms for the chip are adjusted by means of setting fuse values and trim values for each chip. Since the fuse values and the trim values for each chip are different, thus the encryption algorithms and the secret keys obtained from the encryption algorithms are different and unique. Therefore, the operation of the encryption method is simple and reliable.

In summary, by means of the method for chip encryption provided by the present invention, the secret keys obtained from the same matrix chip for different applications or different matrix chips for the same application are different from each other, thereby increasing expenses and difficulty for crackers to crack the chip. Even if one chip is cracked, only a single secret key and the single application may be obtained. That is to say, if the cracker needs to obtain other secret keys and other applications, what they can do is to crack every chip in the batch.

BRIEF DESCRIPTION OF THE DRAWINGS

The accompanying drawings facilitate an understanding of the various embodiments of this invention. In such drawings:

FIG. 1 is a flow chart of a method for chip encryption according to one embodiment of the present invention.

DETAILED DESCRIPTION OF ILLUSTRATED EMBODIMENTS

A further description of the present invention follows by combining with accompanying drawings and embodiments.

Referring to FIG. 1, a method for chip encryption includes:

Step S1, obtaining a fuse value and a trim value of a chip and setting an encryption algorithm. The fuse value and the trim value can be obtained through calculating or tested by means of an external device, and the encryption algorithm can be designed according to actual demands. In this embodiment, the fuse value and the trim value can be obtained by an existing testing device whose functions and working process are well known thus are omitted here.

Step S2, setting the fuse value and the trim value as parameters of the encryption algorithm and obtaining a secret key which is unique for the chip accordingly to the encryption algorithm. The fuse value and the trim value of the chip are unique for each chip because they will be influenced by production equipments and production environments including temperature or humidity when the chips are produced, thus parameters of the encryption algorithm for each chip are different if such a fuse value and such a trim value are set as the parameters, as a result, secret keys calculated from the encryption algorithm with the different parameters are different from one another. That is to say, the secret key for each chip is unique.

Step S3, storing the fuse value, the trim value and the secret key in the chip. The chip is adapted for storing the fuse value, the trim value and the secret key decided by the fuse value and the trim value. It is worth noting that, it's unnecessary to perform the step S1, the step S2 and the step S3 orderly.

Specifically, the trim value is a value for trimming an electric current, a voltage or a resistance of an analog circuit in the chip during a test. After packaged, the chips are required to carry out several tests such as a CP test, a FT test or other tests. What's more, the analog circuit is at least one selected from a group consisting of a LDO circuit (Low Dropout Regulator), a BGR circuit (Brandgap Reference), and an OSC circuit (Oscillating Circuit). The fuse value is a value for fusing a fuse wire in the chip, which can be obtained during the test.

As a preferred embodiment, for improving the security of the chip, the method for chip encryption further includes fusing the fuse wire of the chip after the test is finished thereby a test state of the chip is not recoverable.

As a preferred embodiment, the fuse value of the chip is unique. As another preferred embodiment, the trim value of the chip is unique. In summary, at least one of the fuse value and the trim value of the chip is unique. As is known to all, the fuse value and the trim value are the physical properties of the chip and will barely be created for twice due to the changing production equipments or the changing production environments, thus the fuse value and the trim value of the chip are unique naturally. Therefore, the secret keys obtained by setting the fuse values and the trim values as parameters of the encryption algorithm are unique. Even if a single secret key for one chip is cracked, only the single secret key and a single application of the chip may be obtained, the other chips in a same batch are still secure, thus increasing difficulty for crackers to crack the chips.

The chip includes an external storage and an internal storage, the fuse value, the trim value and the secret key are stored in the internal storage for increasing security for the chip. The internal storage includes a chip memory and a last cache of a processor, the external storage includes a volatile memory and a nonvolatile memory. For further increasing security for the chip, in this embodiment, the fuse value, the trim value and the secret key are stored in the chip by means of memorizer scrambling for the chip memory. For example, a bus can be scrambled. For a N bit bus, there are N! kinds of arrangements just like there are 40320 kinds of arrangements for an 8 bit bus, memorizer scramble means that one of the arrangements will be selected randomly and the bus will not be arranged bit by bit in an increasing or a reducing order. Here is an example, if the data is stored in order, that means, the fuse value is stored in an address 01, the trim value is stored in an address 02, the secret key is stored in an address 03 and other data is stored in other addresses. However, after memorizer scrambling for the chip memory (by calculating with a mapping function for example), the trim value may be stored in the address 03, the fuse value may be stored in an address 07, the secret key may be stored in an address 05 and other data may be stored in other addresses. Thus it is difficult for crackers to find out how the storage is addressed if they don't know which function is utilized, thereby further increasing security for the chip and difficulty for cracking the chip. In other embodiments, other functions can be utilized for readdressing the memory address.

The encryption algorithm is at least one selected from a group consisting of a symmetry algorithm including a DES algorithm (Data Encryption Standard) or an AES algorithm (Advanced Encryption Standard), an asymmetric algorithm including a RSA algorithm or an ECC algorithm (Elliptic Curves Cryptography), a hash algorithm including a MD5 (Message-Digest Algorithm 5) or a SHA-1 (Secure Hash Algorithm-1) and a custom algorithm. As a preferred embodiment, the asymmetric algorithm is utilized. Also, different algorithms can be utilized for different chips according to actual demands.

Embodiments for chip encryption according to the present invention follow. In this embodiment, the AES algorithm is utilized for chip encryption, a length of a password is 192 bit, wherein a length of the fuse value is 8 bit, a length of the trim value is 16 bit and a length of the secret key is 168 bit. The fuse value is set up as X, the trim value is set up as Y, the secret key is set up as Z and a formula for obtaining the secret key is set up as:

$$K=Z+X+Y \qquad (1).$$

When the fuse value of the chip A is X1 and the trim value of the chip A is Y1, the secret key of the chip A can be obtained according to the formula $$K1=X1+Y1+Z \qquad (1):$$

When the fuse value of the chip B is X2 and the trim value of the chip B is Y2, the secret key of the chip B can be obtained according to the formula $$K2=X2+Y2+Z \qquad (1):$$

The fuse value and the trim value of the chip for each chip are different because they will be influenced by producing process. Thus $X1 \neq X2$, $Y1 \neq Y2$ and there is no doubt that $K1 \neq K2$.

In summary, by means of the method for chip encryption provided by the present invention, the secret key obtained from the same matrix chip for different applications or different matrix chips for the same application are different from each other, thereby increasing expenses and difficulty for crackers to crack the chip. Even if one chip is cracked, only the single secret key and the single application may be obtained. That is to say, if the cracker needs to obtain other secret keys and other applications, what they can do is to crack every chip in the batch. Therefore, user's intellectual property can be protected perfectly.

Many other changes and modifications can be made without departing from the conception and range provided by the present invention. It should be understood that, the present invention is not limited to any particular embodiment, and the range provided by the present invention is defined in the annexed claims.

What is claimed is:

1. A method for chip encryption, comprising:
    obtaining a fuse value and a trim value of a chip and setting an encryption algorithm;
    setting the fuse value and the trim value as parameters of the encryption algorithm and obtaining a secret key which is unique for the chip according to the encryption algorithm; and
    writing the fuse value, the trim value and the secret key into the chip;
    wherein the chip comprises an external storage and an internal storage, and the fuse value, the trim value and the secret key are written into the internal storage by means of memorizer scrambling for a chip memory to encrypt the chip;
    wherein the fuse value of the chip for each chip are different, and the trim value of the chip for each chip are different.

2. The method for chip encryption as claimed in claim 1, wherein the trim value is a value for trimming an electric current, a voltage or a resistance of an analog circuit in the chip during a test.

3. The method for chip encryption as claimed in claim 2, wherein the analog circuit comprises at least one selected from a group consisting of a Low Dropout Regulator (LDO) circuit, a Bandgap Reference (BGR) circuit and an Oscillating (OSC) circuit.

4. The method for chip encryption as claimed in claim 1, wherein the fuse value is a value for fusing a fuse wire in the chip, which is obtained during a test.

5. The method for chip encryption as claimed in claim 4, further comprising fusing the fuse wire of the chip after the test is finished.

6. The method for chip encryption as claimed in claim 1, wherein the fuse value of the chip is unique.

7. The method for chip encryption as claimed in claim 1, wherein the trim value of the chip is unique.

8. The method for chip encryption as claimed in claim 1, wherein the internal storage comprises a chip memory and a last level cache of a processor, the external storage comprises a volatile memory and a nonvolatile memory.

9. The method for chip encryption as claimed in claim 1, wherein the encryption algorithm is at least one selected from a group consisting of a symmetric algorithm, an asymmetric algorithm, a hash algorithm and a custom algorithm.

10. The method for chip encryption as claimed in claim 2, wherein the fuse value is a value for fusing a fuse wire in the chip, which is obtained during the test.

11. The method for chip encryption as claimed in claim 3, wherein the fuse value is a value for fusing a fuse wire in the chip, which is obtained during the test.

12. The method for chip encryption as claimed in claim 10, further comprising fusing the fuse wire of the chip after the test is finished.

13. The method for chip encryption as claimed in claim 11, further comprising fusing the fuse wire of the chip after the test is finished.

14. The method for chip encryption as claimed in claim 2, wherein the fuse value of the chip is unique.

15. The method for chip encryption as claimed in claim 3, wherein the fuse value of the chip is unique.

16. The method for chip encryption as claimed in claim 2, wherein the trim value of the chip is unique.

17. The method for chip encryption as claimed in claim 3, wherein the trim value of the chip is unique.

* * * * *